(12) United States Patent
Carson

(10) Patent No.: US 7,568,081 B2
(45) Date of Patent: Jul. 28, 2009

(54) AUTHENTICATING A DATA STORAGE MEDIUM USING PREDETERMINED INTER-SECTOR RELATIONSHIPS

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 359 days.

(21) Appl. No.: 10/483,477

(22) PCT Filed: May 14, 2003

(86) PCT No.: PCT/US03/15151

§ 371 (c)(1),
(2), (4) Date: Jan. 12, 2004

(87) PCT Pub. No.: WO03/098605

PCT Pub. Date: Nov. 27, 2003

(65) Prior Publication Data

US 2004/0168025 A1   Aug. 26, 2004

Related U.S. Application Data

(63) Continuation-in-part of application No. 09/860,971, filed on May 18, 2001, now Pat. No. 6,477,124.

(60) Provisional application No. 60/380,709, filed on May 14, 2002, provisional application No. 60/444,030, filed on Jan. 31, 2003, provisional application No. 60/249,030, filed on Nov. 15, 2000.

(51) Int. Cl.
  *G06F 12/14* (2006.01)
(52) U.S. Cl. .................... 711/163; 711/112; 369/275.1; 369/275.3

(58) Field of Classification Search ................. 711/112, 711/163, 170, 202; 369/275.1, 275.3, 275.4, 369/275.5
See application file for complete search history.

(56) References Cited

U.S. PATENT DOCUMENTS

| 4,228,326 | A | 10/1980 | Dakin et al. |
| 4,800,548 | A | 1/1989 | Koishi et al. |
| 5,070,492 | A | 12/1991 | Ogawa et al. |
| 5,272,687 | A | 12/1993 | Matsushima |
| 5,343,455 | A | 8/1994 | Takeuchi et al. |
| 5,463,604 | A | 10/1995 | Naito |

(Continued)

FOREIGN PATENT DOCUMENTS

WO   WO 03/054878 A1   7/2003

*Primary Examiner*—Jasmine Song
(74) *Attorney, Agent, or Firm*—Fellers, Snider, et al.

(57) ABSTRACT

A data storage medium (230, 400) and associated method (500, 520), apparatus (250, 430) and application routine (110, 524) for authenticating the medium as an authentic copy. The medium (such as a prerecorded or recordable optical disc) is formatted so that a predefined relationship is established (502) between physical locations of at least first and second addressable data sectors (220) prior to recording of data to the sectors (506). The predetermined relationship will be present in an authorized copy of the medium (330) but not in an unauthorized duplicate (332), allowing an application routine to grant or deny access (532, 534) to remaining portions of the medium based on the presence or absence of the detected relationship. The predetermined relationship is further used to embed a forensic data payload to serve as a digital fingerprint on the medium.

39 Claims, 10 Drawing Sheets

U.S. PATENT DOCUMENTS

| | | | |
|---|---|---|---|
| 5,513,160 A | 4/1996 | Satoh et al. | |
| 5,526,339 A | 6/1996 | Shimada | |
| 5,559,777 A | 9/1996 | Maeda et al. | |
| 5,642,342 A | 6/1997 | Murata | |
| 5,687,158 A | 11/1997 | Kawasaki et al. | |
| 5,787,068 A | 7/1998 | Arps et al. | |
| 5,809,006 A | 9/1998 | Davis et al. | |
| 5,812,512 A | 9/1998 | Tobita et al. | |
| 5,825,733 A | 10/1998 | Ogawa | |
| 5,831,964 A | 11/1998 | Tanaka | |
| 5,881,032 A * | 3/1999 | Ito et al. | 369/30.1 |
| 5,933,399 A | 8/1999 | Kim | |
| 6,028,936 A * | 2/2000 | Hillis | 713/168 |
| 6,034,831 A * | 3/2000 | Dobbek et al. | 360/53 |
| 6,097,814 A | 8/2000 | Mochizuki | |
| 6,199,148 B1 * | 3/2001 | Naito | 711/163 |
| 6,236,804 B1 | 5/2001 | Tozaki et al. | |
| 6,320,825 B1 | 11/2001 | Bruekers et al. | |
| 6,477,124 B2 | 11/2002 | Carson | |
| 6,661,768 B1 * | 12/2003 | Yumiba et al. | 369/275.4 |
| 6,747,942 B1 * | 6/2004 | Tanoue et al. | 369/275.3 |
| 2002/0199099 A1 | 12/2002 | Shirai et al. | |
| 2003/0182605 A1 * | 9/2003 | Short et al. | 714/718 |

* cited by examiner

AUTHENTICATING A DATA STORAGE MEDIUM USING PREDETERMINED INTER-SECTOR RELATIONSHIPS

RELATED APPLICATIONS

The present application is a U.S. National Phase application pursuant to 35 U.S.C. §371 of Patent Cooperation Treaty (PCT) Application PCT/US03/15151 filed May 14, 2003. The present application claims the benefit of U.S. Provisional Patent Applications No. 60/380,709 filed May 14, 2002 and No. 60/444,030 filed Jan. 31, 2003, and is a continuation-in-part of U.S. patent application Ser. No. 09/860,971 filed May 18, 2001, now U.S. Pat. No. 6,477,124 issued Nov. 2, 2002.

FIELD OF THE INVENTION

The present invention relates generally to the field of data storage media and more particularly, but without limitation, to a method and apparatus for authenticating a data storage medium as an authorized copy by predetermining the locations of selected data sectors on the medium.

BACKGROUND

Optical discs are one type of data storage medium used to store a wide variety of digitally encoded data. Popular optical disc formats include compact discs (such as audio CD, CD-ROM, CD-R, CD-R/W) and digital versatile discs (such as DVD-audio, DVD-video, DVD-RAM, DVD-R, DVD-RW, DVD-ROM). Optical discs are usually portable in nature and can be played in a variety of settings including personal computers, car audio players, home theater systems, hand-held personal data/entertainment devices, etc.

A typical optical disc comprises a circular disc having one or more recording layers of light reflective material embedded in a refractive substrate. Each recording layer is disposed along a plane substantially normal to an axis about which the disc is rotated and stores data in the form of localized pits and lands along a continuously extending spiral track. A data transducing head uses a laser or similar light source to output a readback signal based on the different reflectivities of the pit and land areas. Decoding circuitry decodes the user data for output by the appropriate playback device.

During readback, an optical disc typically provides main channel (user) data, control (subcode) channel data, and error detection/correction (EDC) channel data. Main channel data comprise the desired user data stored on the disc (audio, video, computer software, etc.) in fixed-size user data blocks (sectors). Control channel data comprise sector header, timing and other types of control information to facilitate playback of the main channel data. EDC channel data indicate the extent to which EDC techniques (parity bits, Reed-Solomon error correction codes, etc.) have been employed to correct detected errors in the main channel and control channel data.

The user data portion of an optical disc can be readily retrieved using various reading devices and stored onto other storage devices such as computer hard discs, floppy discs and recordable optical discs. Optical disc recording devices will accept this user data portion and add the additional address codes, synchronization data, error detection and correction codes, modulation data etc. using built-in per-programmed encoder circuits. This process is sometimes referred to as digital extraction or ripping.

Another increasingly common methodology for copying an existing disc is to use what is sometimes referred to as analog duplication. In this case the original disc is continuously read from lead-in to lead-out to generate a readback signal that is then used to sequentially, directly record the same pit and land sequence on a second, duplicate disc. The duplicate disc thus nominally comprises a bit-for-bit copy of the original and includes all of the errors and copy protection bits as they appear on the original.

Due to the continued world-wide interest in the types of data available on optical discs and other types of media, and the relative ease with which unauthorized duplicate copies can be made, there remains a continued need for improvements in the art for medium authentication schemes that are easily implemented and difficult to detect and defeat. It is to such improvements that the present invention is directed.

SUMMARY OF THE INVENTION

The present invention is generally directed to a method and apparatus for authenticating a data storage medium as an authorized copy. The data storage medium can be a pre-recorded or recordable type medium, and is preferably an optical disc (such as a CD, CD-R, CD-R/W, DVD, DVD-R, DVD-R/W, etc.).

In accordance with one aspect, the method comprises formatting the data storage medium so that a predefined relationship is established between physical locations of at least first and second addressable data sectors prior to recording of data to the sectors. The predefined relationship is established by generating a profile indicative of the exact number of channel bits to be recorded to each track, and controlling the writing operation to place the sectors in the desired locations.

The locations of the at least first and second sectors are selected such that the predetermined relationship will be present in an authorized copy of the medium, but will not appear in an unauthorized duplicate formed from the authorized copy. During a readback operation, access can be granted (or denied) in relation to the presence or absence of the predefined relationship. The predetermined relationship can further be used to embed a forensic data payload to serve as a digital fingerprint on the medium which can be retrieved upon examination of the authorized copy.

In accordance with another aspect, a system is provided for formatting a data storage medium consistent with the foregoing method. The system preferably comprises a motor configured to rotate the medium in response to a motor speed rotation signal, a write assembly which selectively writes data to the medium in response to a write signal, and a control circuit which generates the motor speed rotation signal and the write signal in relation to a pre-generated profile which establishes the predetermined relationship between at least selected sectors of data on the medium prior to the writing of the data.

Preferably, the system includes a master clock which generates a master clock signal at a first frequency, a clock divider circuit which outputs a write clock signal in response to the master clock signal used to establish timing of transitions in the write signal, and a programmable generator circuit which outputs the motor speed rotation signal in response to the master clock signal and the pre-generated profile. A lookup table preferably outputs values to the programmable generator circuit in relation to the pre-generated profile to adjust the rotational speed of the motor so that an exact, predetermined number of channel bits are written to the medium over each revolution of the medium.

In accordance with another aspect, a data storage medium is provided consistent with the foregoing description having a plurality of addressable data sectors formed on a plurality of tracks. The sectors are located in preselected physical locations in accordance with a profile generated prior to recording of the sectors, the profile establishing a predetermined relationship between the physical locations of at least selected sectors to identify the data storage medium as an authorized copy.

In some preferred embodiments, the medium is a prerecorded medium formed as a replicated copy from a mastering process. In other preferred embodiments, the medium is a recordable medium having pre-groove information recorded to the medium in relation to the profile so that, when data are subsequently written to the medium, the sectors are located in relation to the pre-groove information.

In yet another aspect, an application routine is provided of the type that is executed in a processor environment to read data from a data storage medium. The medium is formatted as described above so that desired physical locations of a plurality of sectors the medium are preselected to establish a predetermined relationship between at least a first selected sector and a second selected sector prior to recording of data to the medium to locate said sectors, and a writing signal is modulated to locate said sectors on the data storage medium in the predetermined desired physical locations.

The application routine is configured to authenticate the medium by measuring an access parameter relating to a sequential access of the at least first and second sectors. The application routine then either grants access to remaining sectors on the medium when the measured access parameter indicates the predetermined relationship is present on the medium, or denies access to remaining sectors on the medium when the measured access parameter indicates the predetermined relationship is not present on the medium.

In some preferred embodiments, the access parameter comprises a speed of a motor used to rotate the medium as the sectors are read; in other preferred embodiments, the access parameter comprises an elapsed access time to read the various sectors. The application routine further preferably decodes forensic data embedded by the predetermined relationship.

These and various other features and advantages of the present invention will be apparent from a reading of the following detailed description in conjunction with the appended drawings.

DETAILED DESCRIPTION

As embodied herein, the present invention is generally directed to a data storage medium and associated method, apparatus and application routine for authenticating the medium as an authentic copy.

As used herein, "authentication" will be understood to generally describe a scheme whereby the medium can be determined as coming from an authorized source (i.e., an "original" copy), or as having been produced using an unauthorized process (i.e., a "pirated" copy). As explained below, this generally entails providing the original with particular features such that, when a pirated copy is made from the original, the features do not appear on the pirated copy. "Copy protection" describes a particular type of medium authentication whereby a pirated copy will not operate properly in a readback system.

Various embodiments discussed below are directed to specific types of prerecorded and recordable optical discs, such as compact discs (CDs, CD-R, CD-R/W, etc.) digital versatile discs (DVD, DVD-R, DVD-RIW, etc.), hybrid discs with both prerecorded and recordable portions, etc. It will be understood, however, that the claimed invention is not so limited, but rather covers other types of optical discs and other forms of data storage media, such as magnetic and magneto-optical recording discs, tapes, arrays, etc. whether existing now or developed in the future.

Overview

Figure 1:
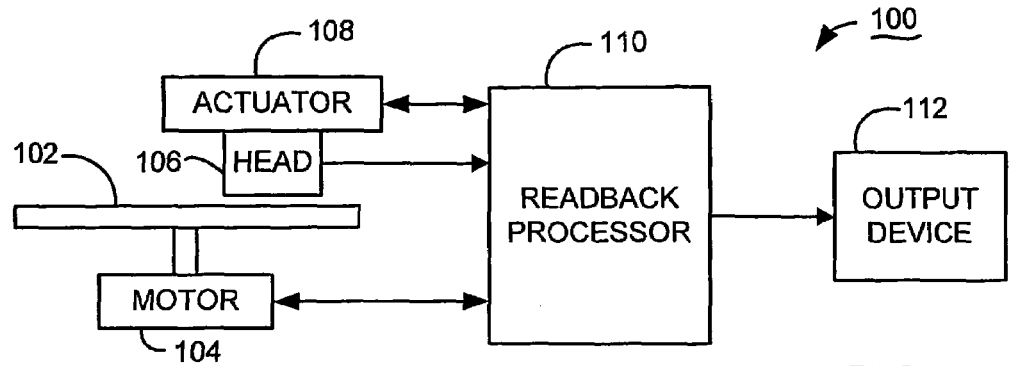
FIG. 1 shows a general block representation of a readback system used to readback data from a data storage medium, preferably comprising an optical disc.

FIG. 1 provides a simplified, functional block diagram of an optical disc readback system 100. An optical disc 102 is rotated by a disc motor 104. An optical disc pick-up assembly comprises a data transducing head assembly 106 supported by a linear actuator assembly 108. It is common for optical discs such as 102 to have data stored at a constant linear velocity (CLV) so that the disc rotational speed is varied as the head assembly 106 moves across the radius of the disc 102.

A readback processor circuit 110 receives a modulated readback signal from the head assembly 106 and performs the appropriate signal processing and conditioning to provide an output signal to an output device 112. The nature and character of the output device 112 will generally depend upon the type of data stored by the optical disc 102; for example, if the optical disc stores audio data, the output device 112 can comprise an automobile or home stereo system; if the optical disc stores computer data (including MP3 audio files), the output device 112 can comprise a personal computer (PC); if the optical disc stores video data, the output device 112 can comprise a television or home theater system, etc.

Figure 2:
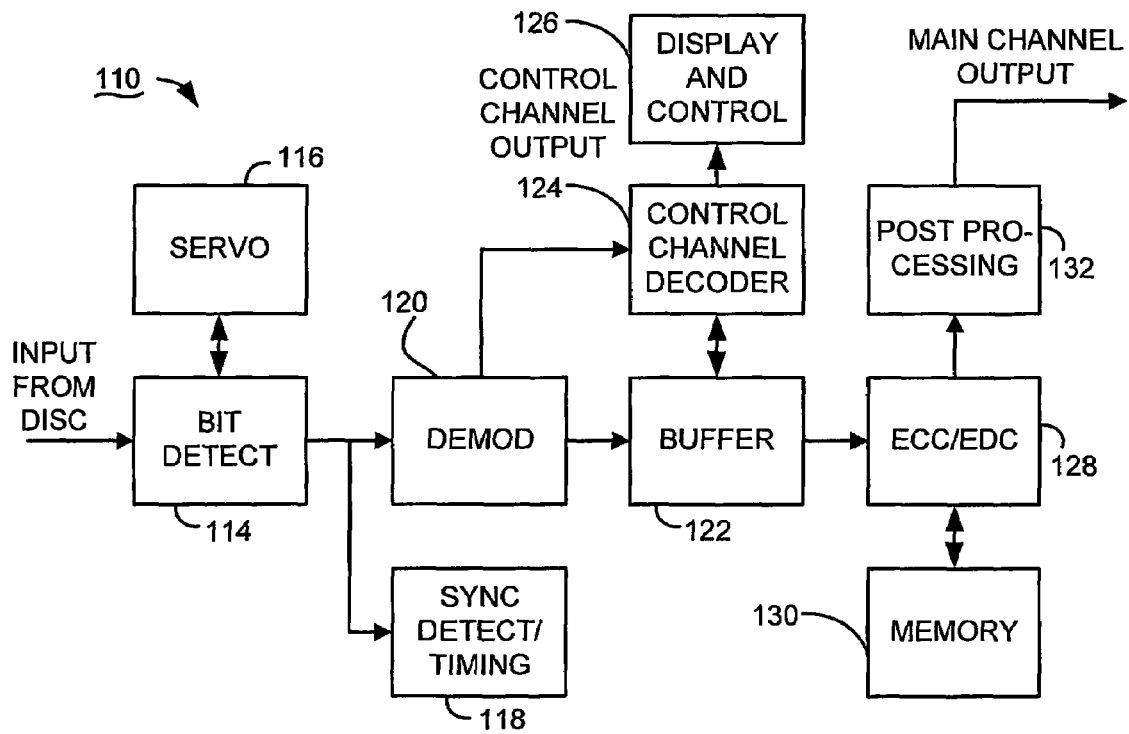
FIG. 2 shows a generalized block diagram of a readback circuit of a readback system such as shown in FIG. 1.

FIG. 2 provides a generalized functional block diagram of hardware and/or software/firmware elements of the readback processor circuit 110 of FIG. 1. The readback signal obtained from the disc 102 is provided to a bit detect circuit 114 which performs bit detection and other preliminary processing. The bit detect circuit 114 interfaces with a servo control circuit 116 which provides control signals to the motor 104, head assembly 106 and actuator assembly 108.

The output from the bit detect circuit 114 is provided to a synchronization (sync) detection and timing circuit 118 which provides timing signals to various remaining blocks of the circuit. A demodulation (demod) circuit 120 performs the requisite demodulation of the readback signal to recover the original digital bit sequence. For reference, 8/14 modulation is typically employed for CDs and 8/16 modulation is typically employed for DVDs; thus, the demod 120 converts each set of 14 or 16 received channel bits back into the original 8 bits of digital data.

The recovered data are provided to a buffer 122. A control channel decoder 124 decodes the control channel (header, timing, etc.) portion of the recovered data and provides the requisite inputs to a user display and control block 126. An error correction code/error detection code (ECC/EDC) module 128 performs error detection and correction operations (using memory 130) and outputs corrected data to a post-processing unit 132, which provides final processing of the data and outputs the main channel data to the output device 112 (FIG. 1).

Figure 3:
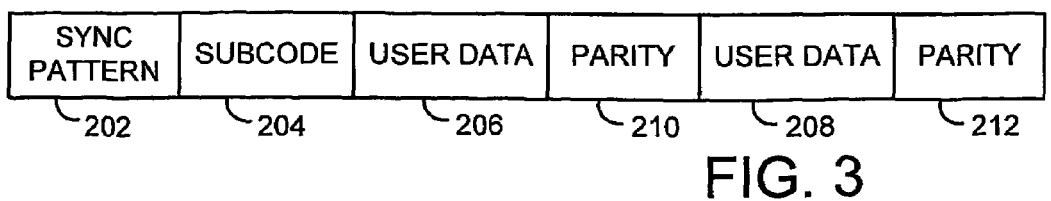
FIG. 3 generally illustrates the manner in which data are stored on a compact disc (CD).

FIG. 3 provides a diagram generally illustrating the manner in which data are typically formatted on a compact disc (CD). It will be noted that a number of different CD formats are used in the industry in accordance with established standards, including ICE 908 ("Red Book"—CD audio), ISO/IEC 10149 ("Yellow Book"—CD-ROM), ISO/IEC 11172/1/2/3 ("Orange Book" —CD-R), etc. Thus, it will be understood that FIG. 3 is a generalized format representation and is not exhaustive.

The basic unit of data storage on a CD is referred to as a frame (numerically designated at 200). Each frame 200 comprises 588 channel bits and generally includes a leading synchronization pattern field 202, a subcode field 204 user data fields 206 and 208, and parity (error correction) fields 210 and 212.

Each consecutive sequence of 98 frames constitutes a top-level sector. Each sector has two primary components: a subcode block (98 bytes) and a user data block (2352 bytes). The 98 bytes of subcode in each sector provide lead-in and lead-out data, header, and timing data in the control channel (FIG. 2). The 2352 byte user data block stores the user data returned in the main channel, and has a format the depends on the type of data stored on the CD (e.g., audio, CD-ROM, etc.).

Other types of optical discs (and other media) have their own associated formats, but all generally arrange the data into addressable sectors. For example, DVDs typically utilize a 2064 byte sector size. Each set of 16 consecutive data sectors are interleaved into an error correction code (ECC) block with additional parity bytes appended thereto. The ECC block is then broken into 16 physical sectors that are sequentially recorded to the medium.

Figure 4:
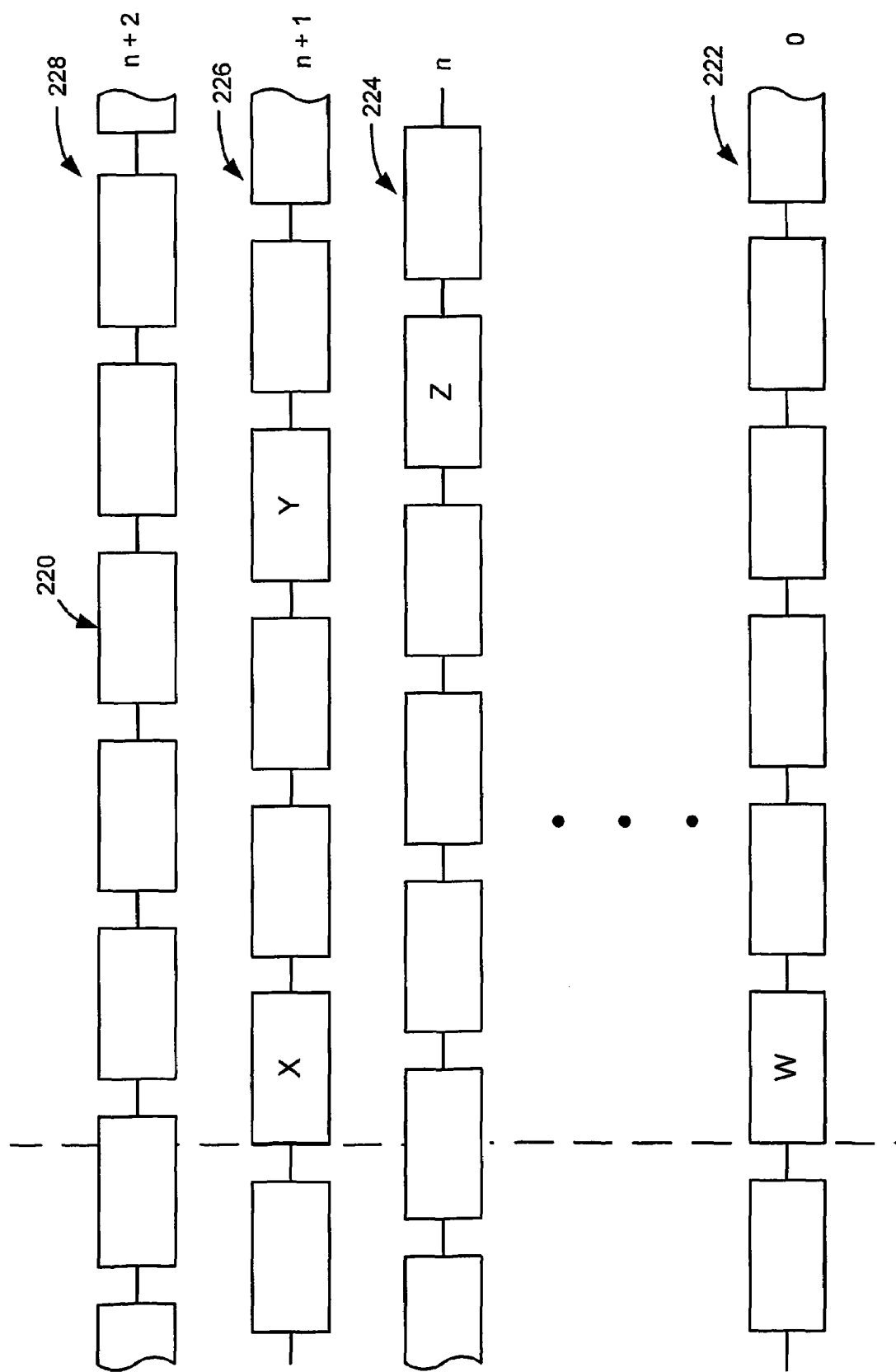
FIG. 4 represents multiple sectors on adjacent tracks on a storage medium such as a CD.

FIG. 4 generally illustrates the manner in which sectors 220 are arranged on a number of circular tracks on a recording medium in accordance with preferred embodiments of the present invention. The tracks can be discrete, concentric circles, or can be formed from a continuous spiral that continuously moves outwardly over each disc rotation. The tracks are numerically designated at 222, 224, 226 and 228 and are incrementally identified in FIG. 4 as tracks 0, n, n+1 and n+2, respectively.

At least selected ones of the sectors 220 are physically located in predetermined two-dimensional relationships (i.e., along the tracks and across the tracks, respectively). For example, using sector W on track 0 as a reference point, sector X on track n+1 is at the same angular position as sector W (as denoted by broken line 230) and is radially separated from sector W by n+1 tracks. Sector Y on track n+1 is shown to be angularly offset from sector W by exactly four sectors and is radially separated from sector W by n+1 tracks. Sector Z on track n is shown to be angularly offset by some selected number of channel bits (approximately four and ½ sectors) from sector W, and is radially separated from sector W by n tracks.

The inter-sector relationships are predetermined prior to recording and are selected such as to be present in an authorized copy, but not in an unauthorized (pirated) copy; that is, an unauthorized duplicate will tend to have different inter-sector relationships than the original.

Preferred manners in which inter-sector relationships are predetermined for pre-recorded and recordable media will now be discussed in turn.

Pre-Recorded Media

Figure 5:
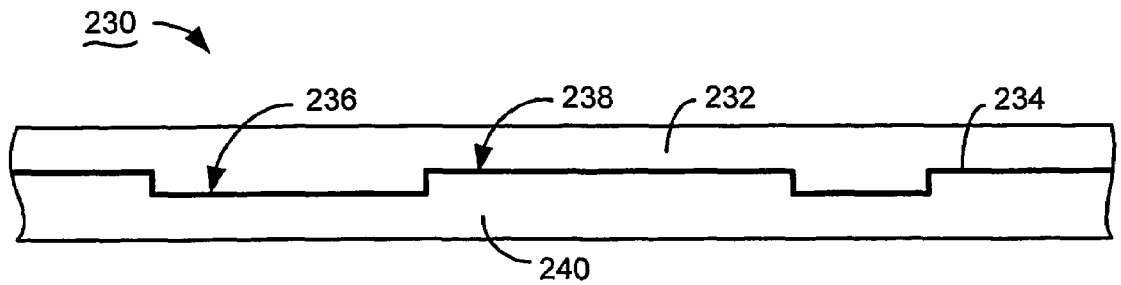
FIG. 5 provides an elevational representation of a prerecorded medium (such as a CD) to illustrate the general manner in which pits and lands are prerecorded using an embedded, internal reflective layer of material, the view in FIG. 5 generally taken along a track of the medium.

FIG. 5 provides an elevational representation of a single layer, pre-recorded optical disc 230 (in this case, a CD). The CD 230 includes a substrate 232 formed of polycarbonate having an outermost diameter of nominally 120 millimeters, mm ($10^{-3}$ meters). An embedded recorded layer 234 comprises a reflective layer of material having a series of pits 236 and lands 238. A protective backing layer 240 is preferably formed of resin. The different reflectivity of the pits 236 compared to that of the lands 238 enables the generation of a readback signal which is used to read back the data recorded to the CD 230.

The CD 230 is preferably formed by generating a master disc with the desired pit and land sequence, forming a number of stampers from the master disc and then using injection molding or similar techniques to form a population of replica discs from the stampers. CDs such as 230 are typically formed in high volume replication facilities where large quantities of replicas are concurrently formed.

Figure 6:
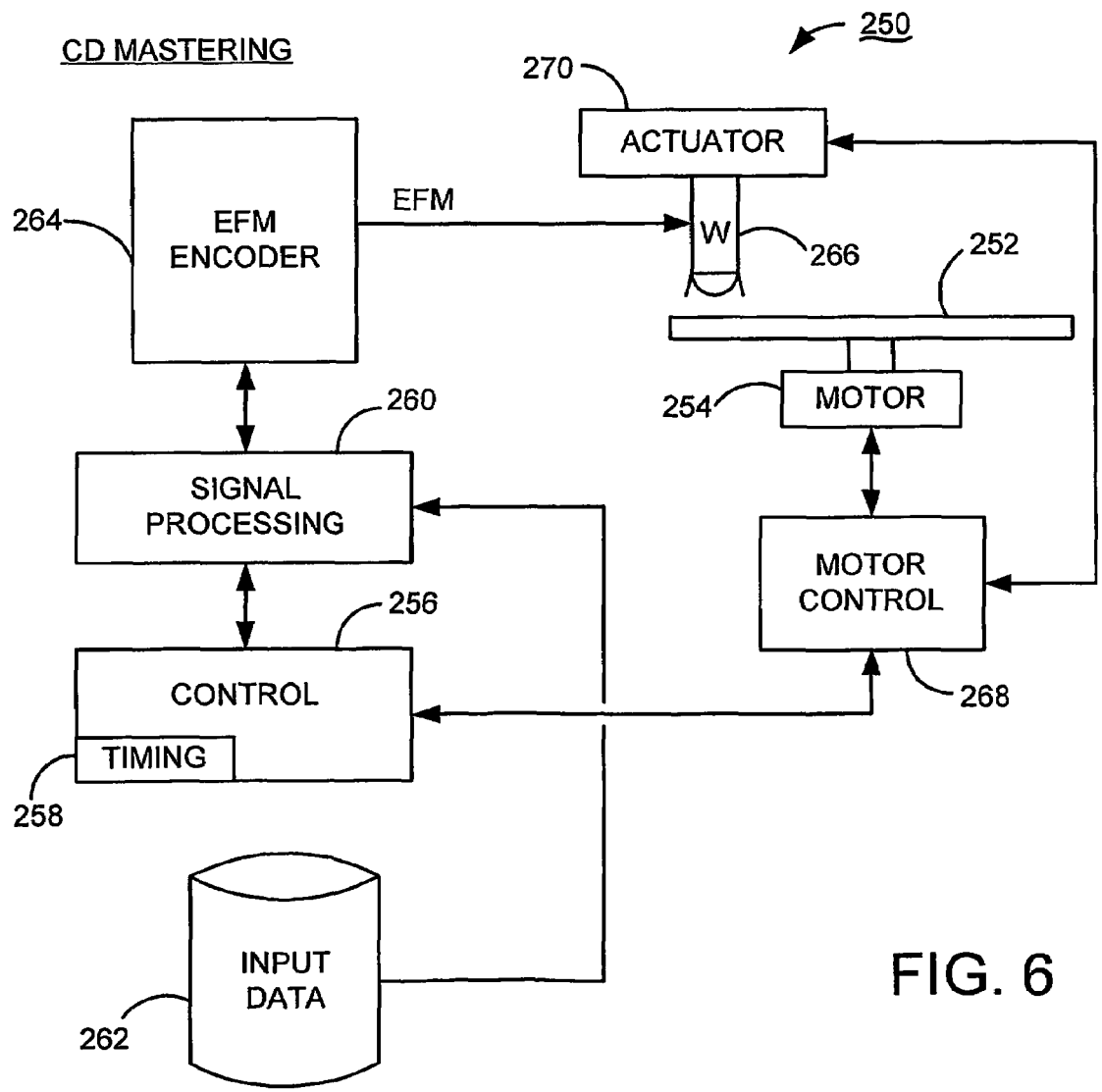
FIG. 6 provides a functional block diagram of a mastering system used to generate a master disc from which replicated, prerecorded discs can be made.

FIG. 6 illustrates a mastering system 250 used to create the master disc from which the CD 230 of FIG. 5 is replicated. A glass master 252 is provided with a spun-coat layer of photoresist, and is rotated by a motor 254.

A control block 256 with associated timing circuitry 258 provides top level control of the mastering process. A signal processing block 260 receives input data from source 262, formats the input data into the desired form and generates the requisite subcode and error detection and correction (EDC) codes. The signal processing block 260 provides a bit stream to an EFM (extended frequency modulation) encoder 264 which generates an EFM signal representative of the desired pit and land sequence on the glass master 252.

The EFM signal is used to modulate a write laser 266 to selectively expose the layer of photoresist. A motor control circuit 268 controls both the rotational speed of the glass master 252 and an actuator 270 used to advance the write laser 266 across the radius of the glass master.

Figure 7:
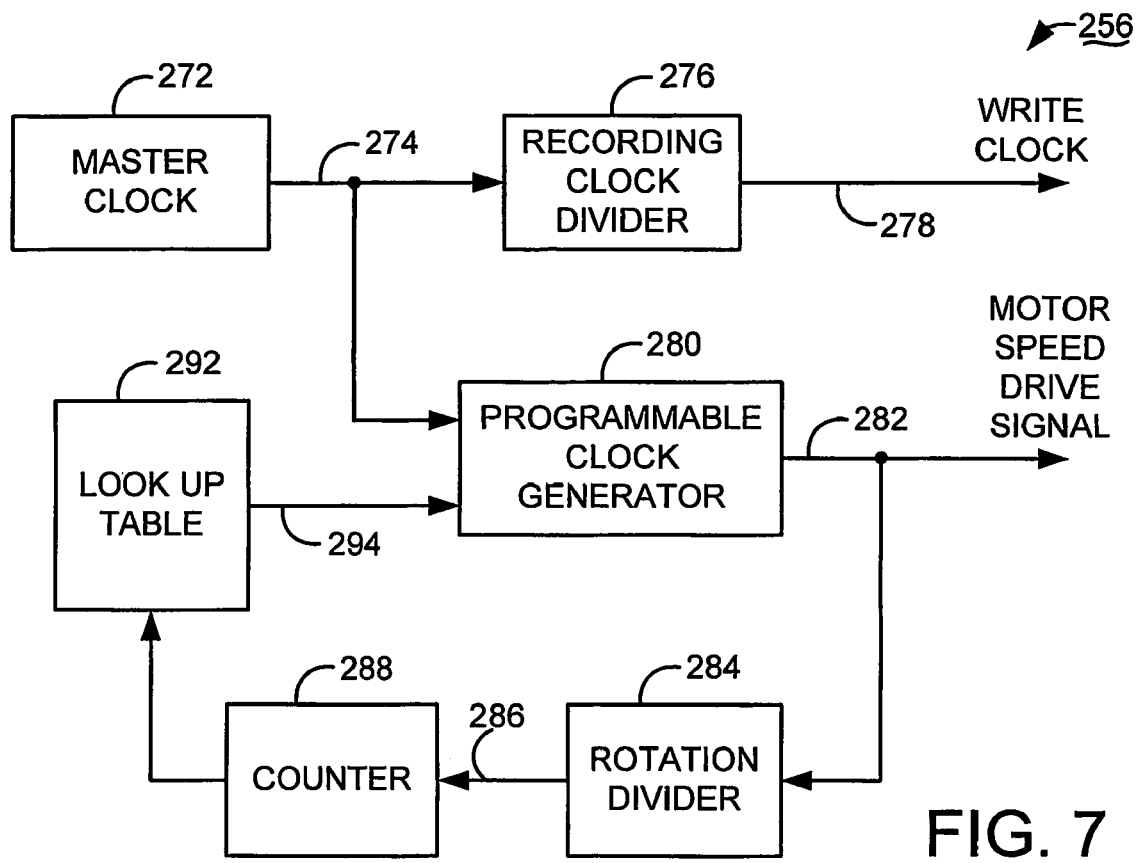
FIGS. 7 and 7A represent alternative configurations of relevant portions of a control circuit of the mastering system of FIG. 6.

FIG. 7 provides a functional block diagram of relevant portions of the control block 256 of FIG. 6. A master clock 272 generates a master clock signal at a predetermined frequency on path 274. The master clock signal is supplied to a recording clock divider block 276, which divides down the master clock frequency to generate a write clock at a desired write frequency for the EFM signal. The write clock is provided to the signal processing block 260 and EFM encoder 264 via path 278.

It is contemplated that in one preferred approach the mastering system 250 of FIG. 6 writes the data at a constant frequency and adjusts the rotational speed of the glass master 252 to achieve constant linear velocity (CLV) recording. Thus, the write clock is provided at a single frequency during the entire mastering operation. However, in alternative embodiments the recording clock divider 276 of FIG. 7 is configured to adjust the frequency of the write clock as the write laser 266 moves to different locations of the glass master 252, so that both the write clock and the motor speed are adjusted to produce the predetermined inter-sector relationships.

The master clock signal is further supplied to a programmable clock generator 280, which operates to output a motor speed drive signal on path 282. The motor control block 268 adjusts the rotational rate of the motor 254 in relation to the frequency of the motor speed drive signal. The motor speed drive signal is a multiple of the actual motor speed, such as 250×; thus, for example, if a motor rotational rate of 10 Hz (rotations/sec) is desired, the motor drive speed signal will have a frequency of 10×250=2500 Hz.

The motor speed drive signal is provided to a rotation divider block 284, which divides the motor speed drive signal by the motor speed multiplier (e.g., 250) to produce an index pulse once per revolution of the motor 284. The index pulses are supplied via path 286 to a counter 288, which outputs a binary coded value of each current revolution on path 290 to a lookup table 292. The counter 288 thus counts the tracks (revolutions) and identifies when each new track begins.

The lookup table 292 preferably contains a desired motor rotation value for every track on the glass master 252. As each successive track is started, the lookup table 292 outputs on path 294 a binary coded value indicative of the desired frequency of the motor speed drive signal for that track. The programmable clock generator 280 thus programmably adjusts the output frequency of the motor speed drive signal over each revolution of the glass master 252 in relation to the lookup table 292.

Figure 7A:
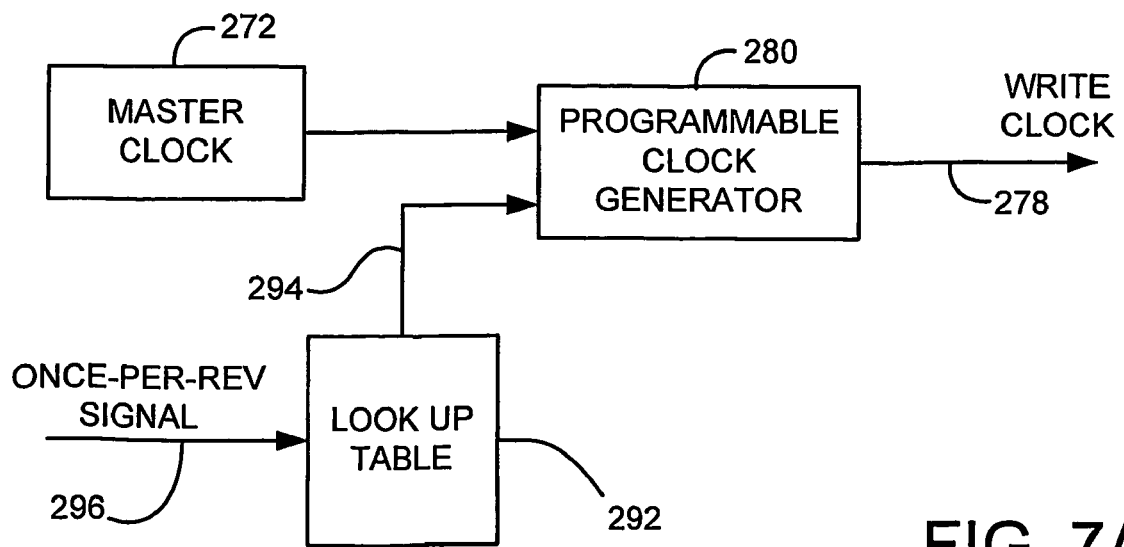

FIG. 7A provides another alternative embodiment of relevant portions of the control circuit 256 of FIG. 6. Like reference numerals have been used in FIGS. 7 and 7A for similar components shown therein.

In the circuit of FIG. 7A, the master clock oscillator 272 provides a master clock signal to the programmable clock generator 280, which in this embodiment generates the write clock signal on path 282. A separate master oscillator (not shown) incorporated into the motor control circuit 268 (FIG. 6) is used to rotate the motor 254 at a substantially constant CLV in a conventional manner.

A once-per-revolution signal is provided on path 296 from the motor control circuit 268 and comprises an index signal sensed from each rotation of the motor (similar to the signal on path 286 in FIG. 7). The once-per-revolution signal is provided to the lookup table 292, which is preprogrammed with appropriate values indicative of the desired write clock frequency for each track (revolution) of the medium during recording.

The lookup table 292 thus outputs an appropriate value over each motor revolution to the programmable clock generator 280 so that the desired write clock frequencies are provided on path 282.

In both the circuits of FIGS. 7 and 7A, for a given track (revolution) on the glass master the total number of channel bits that are recorded to that track are a function of the write clock, the rotational length of the track, and the motor speed. By altering the values of the lookup table 292, the exact number of channel bits on each track can be specified in advance. This will result in a readback data rate (T) that selectively varies with position (radius) while the disc is subsequently rotated at a constant linear velocity (CLV). An exemplary data rate profile generated by the circuits of FIGS. 6, 7 and 7A is set forth by FIG. 8.

Figure 8:
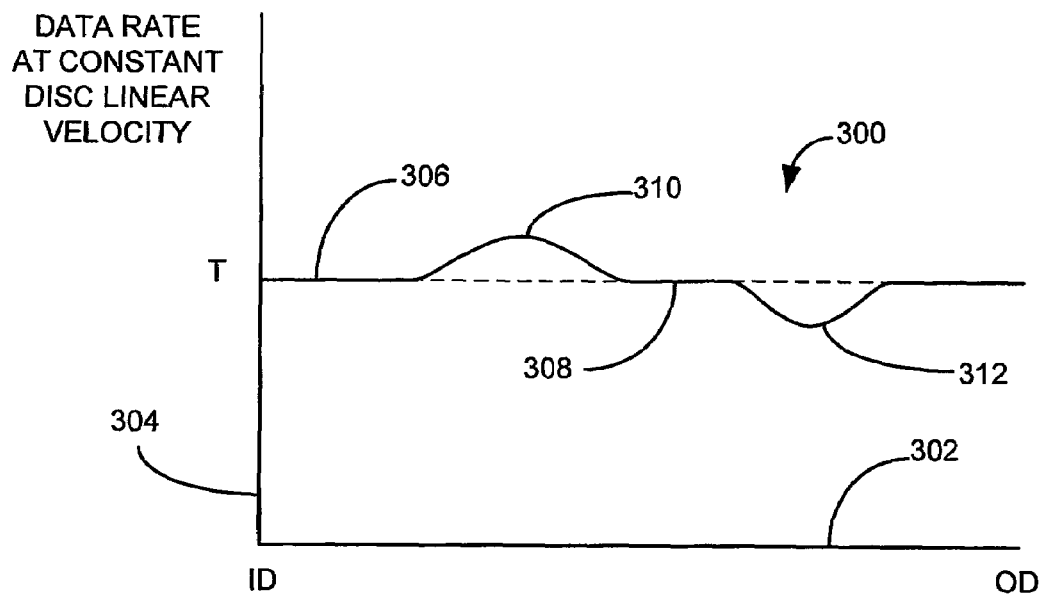
FIG. 8 is a graphical representation of a data rate profile established for a data storage medium in accordance with preferred embodiments.

The data rate profile of FIG. 8, numerically denoted at 300, generally indicates the frequency at which data are written to the master disc in accordance with a preferred embodiment. The profile 300 is plotted against an x-axis 302 indicative of disc position (from ID to OD) and a y-axis 304 indicative of frequency (for a constant linear velocity of the disc).

From FIG. 8 it will be observed that in this example data are written at a nominal data rate in noncontiguous data areas 306 and 308, and the data in these areas have physical symbol lengths that nominally represent conventional CLV recording. However, velocity disruption zones are provided at 310 and 312 having data written at somewhat different data rates (the data in zone 310 represent an increased data rate and the data in zone 312 represent a decreased data rate).

The data in zone 310 will tend to have shorter pits and lands as compared to the nominal zones 306 and 308, and the data in zone 312 will tend to have longer pits and lands than those in the zones 306, 308. Of course, the profile of FIG. 8 is exemplary in nature so that any number of other types of profiles can be employed as desired. In some embodiments the changes in data rate exemplified by the zones 310, 312 are preferably selected so as to not cause a loss of frequency lock during continuous readback, while in other embodiments the changes in data rate can be selected to impede continuous readback. In other embodiments, the changes in data rate are continuous across the radius of the disc.

Figure 9:
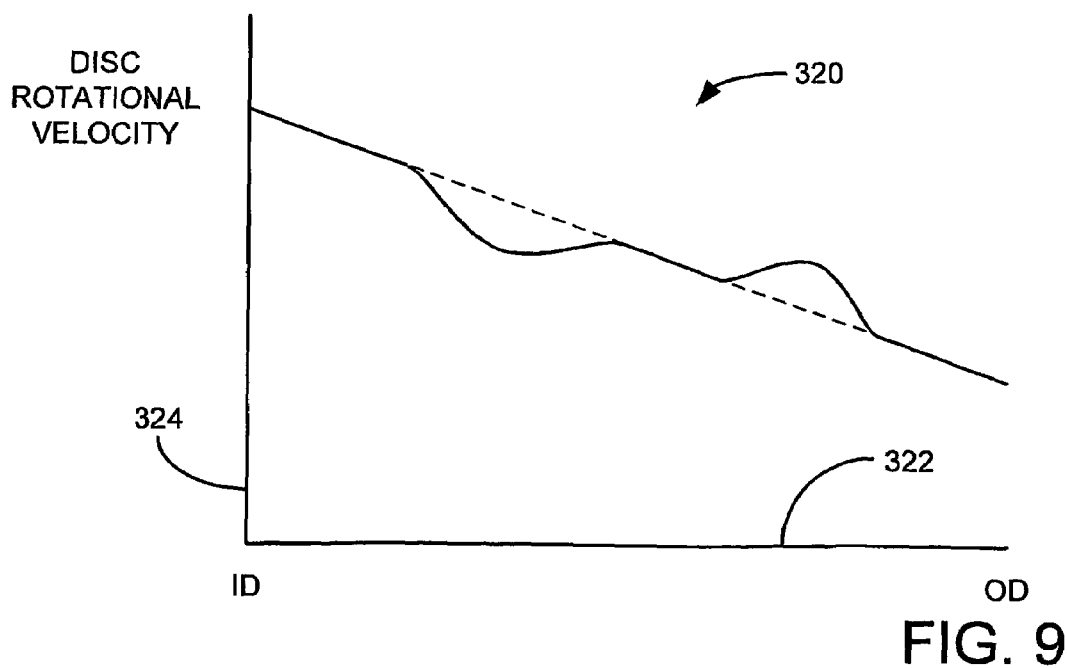
FIG. 9 is a graphical representation of a motor velocity profile required to readback data at a constant linear velocity from the medium formatted in accordance with FIG. 8.

FIG. 9 graphically represents a disc rotational velocity profile 320 required to maintain a constant data rate during CLV readback of the disc of FIG. 8. The profile 320 is plotted against a position (radius) x-axis 322 and a disc rotational velocity 324 y-axis. A readback system (such as 100, FIG. 1)

will attempt to speed up and slow down the medium in accordance with the profile 320 to maintain a constant readback data rate.

Figure 10:
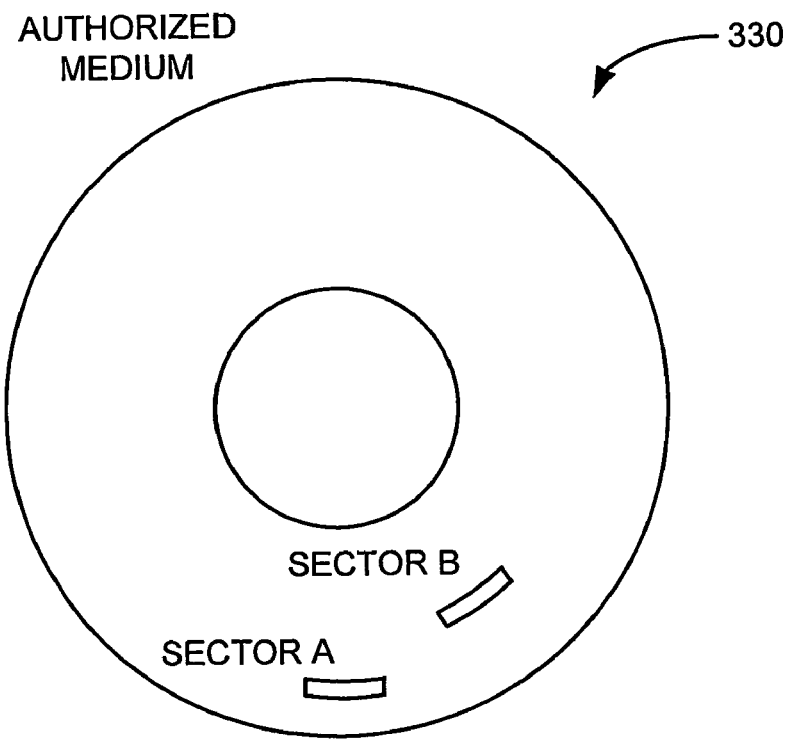
FIG. 10 generally illustrates a selected inter-sector relationship on an authorized medium.

FIG. 10 generally represents the resulting placement of certain sectors on an authentic medium 330 at predetermined locations. While only two sectors (A and B) are represented in FIG. 10, it will be understood that any number of the prelocated sectors can be used for self-authentication. The prelocated sectors can further be arranged to embed a forensic data payload (digital fingerprint) that identifies a particular recording, recording system, customer, region of the world, recording period, etc.

Figure 11:
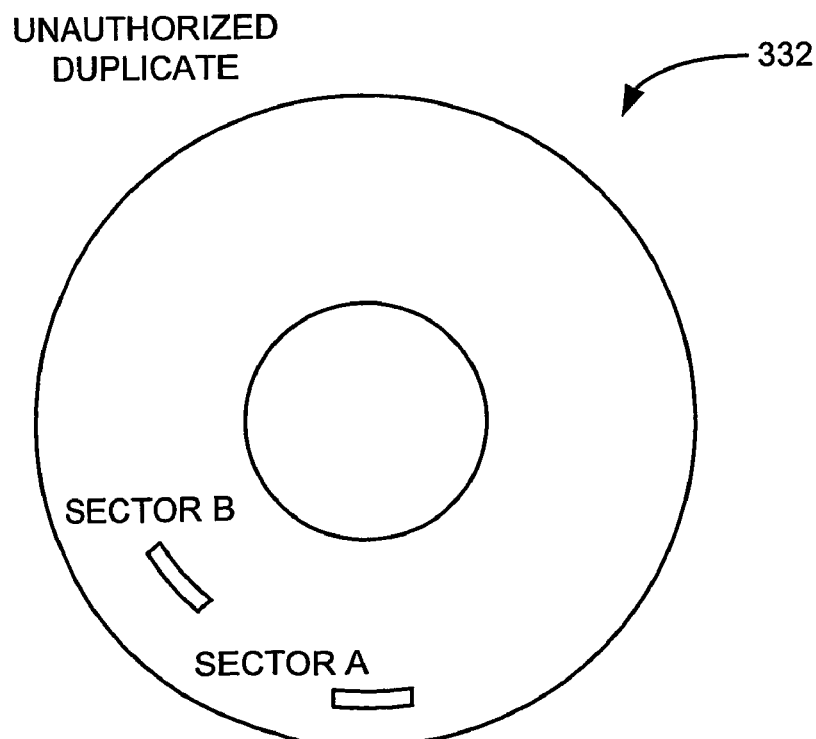
FIG. 11 generally illustrates an unauthorized duplicate medium having a different inter-sector relationship from that of FIG. 10.

Regardless whether the authentic medium 330 is copied using a bit for bit recording process whereby the authentic medium 330 is read lead-in to lead-out and an EFM is generated to cut the same pattern on a duplicate master, or whether the authentic medium 330 is copied using a remastering technique so that the user data are retrieved and new subcode is generated for a master disc, the resulting unauthorized duplicates (such as shown at 332 in FIG. 11) will generally have different inter-sector relationships than the original. The unauthorized duplicates 332 will therefore not exhibit the profiles of FIGS. 8 and 9 and the inter-sector relationships as represented by FIG. 10, allowing the unauthorized duplicate to be identified and rejected.

As mentioned above, should the velocity disruption zones (FIG. 8) be sufficient to prevent continuous lead-in to lead-out playback, it will generally not be possible to duplicate the authentic medium 330 using a continuous lead-in to lead-out read.

Copying the contents of the authorized medium 330 to a recordable medium (CD-R, CD-R/W, DVD-R, DVD-R/W, etc.) will also result in different inter-sector relationships on the recordable medium, resulting in a useless recorded copy. The reasons for this will now be discussed in the following section.

Recordable Media

Recordable media (such as CD-R, CD-R/W, DVD-R, DVD-R/W, hybrid CD and DVD, etc.) are becoming increasingly popular as a means for consumers to create their own media that can be played in standard media players. Commercial application providers are also increasingly using recordable media in lieu of standard replicated media to provide applications to the marketplace. The use of prerecorded media eliminates the time required to utilize a mastering and replication process, which can be advantageous for low production runs.

Figure 12:
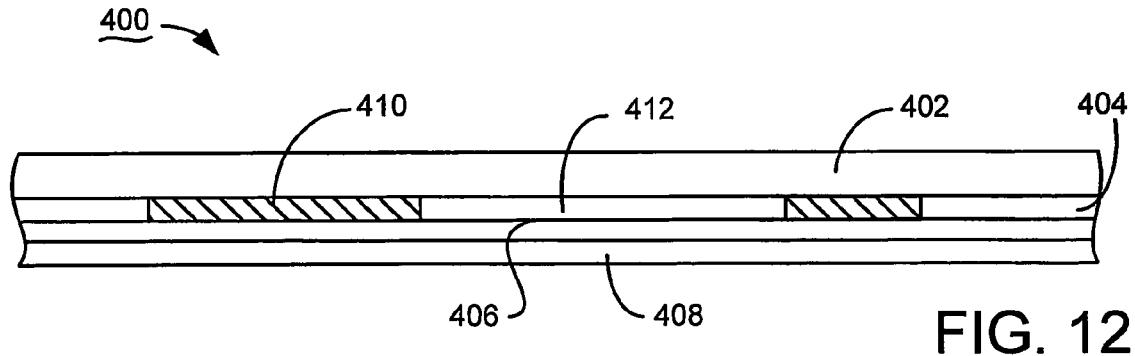
FIG. 12 provides an elevational representation of a recordable medium (such as a CD-R) to illustrate the general manner in which an internal dye layer is selectively processed to provide areas of different reflectivity to provide pit and land type areas in the recorded medium, the view in FIG. 12 generally taken along a track of the medium.

FIG. 12 provides a sectional view of a portion of a recordable CD (CD-R) 400. A CD-R is a recordable medium that, once recorded, nominally operates in the same way as the CD 230 of FIG. 5 during playback. The CD-R 400 generally includes a translucent substrate 402, a recording layer 404 (preferably comprising a layer of nominally translucent dye), a reflective layer 406 (preferably comprising a gold alloy or similar metal) and a protective backing layer 408.

During a recording operation, a write beam of light selectively impinges the recording layer 404 to cause a localized change in the reflectivity of the layer, such as shown by stripe 410. The stripe 410 has a different reflectivity as compared to the nonexposed portions of the recording layer such as denoted at 412. The stripes 410 and unexposed portions 412 function as the pits and lands 236, 238 of FIG. 5 during a readback operation.

Figure 13:
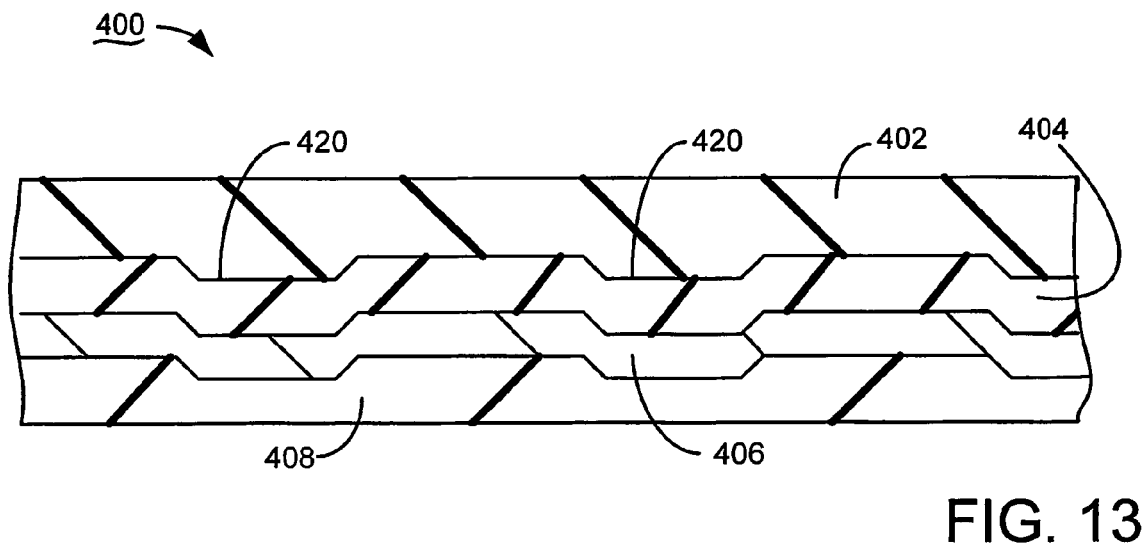
FIG. 13 provides an elevational representation of the recordable medium of FIG. 12 along a second direction perpendicular to the view of FIG. 8, with FIG. 9 generally illustrating the presence of a wiggle pre-groove used for timing and tracking purposes during a recording operation.

The sectional view of FIG. 12 shows the CD-R 400 along a particular track. FIG. 13 is perpendicular to the view of FIG. 12 and provides a sectional view of the CD-R 120 across several tracks. As before, the layers in FIG. 13 include the substrate 402, recording layer 404, reflective layer 406 and protective backing layer 408. The tracks are predefined using a pre-groove 420 preferably comprising a continuous spiral that extends from the inner diameter (ID) to the outer diameter (OD) of the disc.

Figure 14:
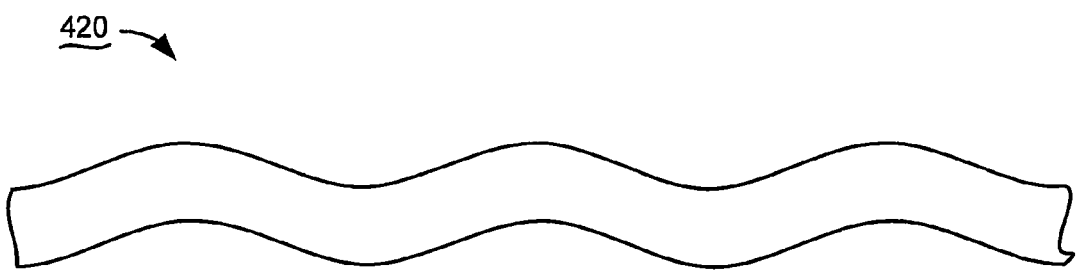
FIG. 14 generally illustrates the wiggle pre-groove of FIG. 13 in greater detail.

Instead of being perfectly concentric, the pre-groove 420 wobbles at a nominal frequency of 22.05 kilohertz (kHz), as shown (in exaggerated fashion) in FIG. 14. The nominal carrier frequency provides motor speed control information to a CD writer system. In addition, the wobble is frequency modulated to provide sector address information commonly referred to as ATIP (absolute time in pre-groove).

The ATIP information is arranged in a number of sequential frames and provides information similar to the information provided by the Q channel in a conventional CD, such as elapsed time (in minutes, seconds and frames), starting and ending times for lead-in and lead-out, and error correction bytes.

ATIP information also typically includes disc type and manufacturer information, a recommended power setting during recording, a maximum recording speed, etc. The physical sectors of data subsequently written to the disc nominally align with the ATIP sectors; that is, the ATIP information serves to define where the actual data sectors will be subsequently placed on the disc.

At this point it will now be apparent that copying a prerecorded CD to a recordable CD-R will advantageously force the various sectors from the original CD to be placed in locations on the recorded CD-R as dictated by the format of the CD-R, thereby altering the relationships among the various sectors. A copy of a pre-recorded application disc made to CD-R will therefore not operate properly in the readback system 100, if the application requires the predetermined locations to be present on the disc as discussed above.

Additionally, in accordance with preferred embodiments of the present invention, a CD-R (and other recordable media) is provided with modified ATIP information to provide specially configured recordable media with selected sectors being located at predetermined locations. A subsequent recording operation will result in an original CD-R with the various sectors at the predetermined areas (exactly the same as the mastered, pre-recorded CD 230 discussed above). Attempts to copy the contents of the original CD-R to another, blank CD-R will result in the second CD-R having the sectors in different locations, thus allowing the second CD-R to be identified as an unauthorized duplicate and rejected.

In general, it has been found more difficult to provide copy protection to CD-Rs (and other recordable media) as compared to conventionally mastered and replicated CDs. One reason is that it is often technically and financially prohibitive to modify the data encoder and modulation circuitry in production CD-R recorders in the same manner as data encoder and modulation circuitry used in conventional CD mastering systems. This is because the encoding and modulation functions are typically implemented in LSI integrated circuits which are not field modifiable.

Another reason is that the recording rate at which data are written to a CD-R is predetermined by the wobbled pre-groove on the blank media. Recorders lock onto the nominal frequency of the wobble to accurately set the writing channel bit rate at a precise multiple of the nominal frequency of the wobble. Due to the fact that the nominal frequency of the wobble pre-groove is embossed on the blank media, it is not possible to alter the recording velocity on the recorded CD-R disc, and therefore not possible to alter the two-dimensional relationships between the physical locations of the sectors.

Figure 15:
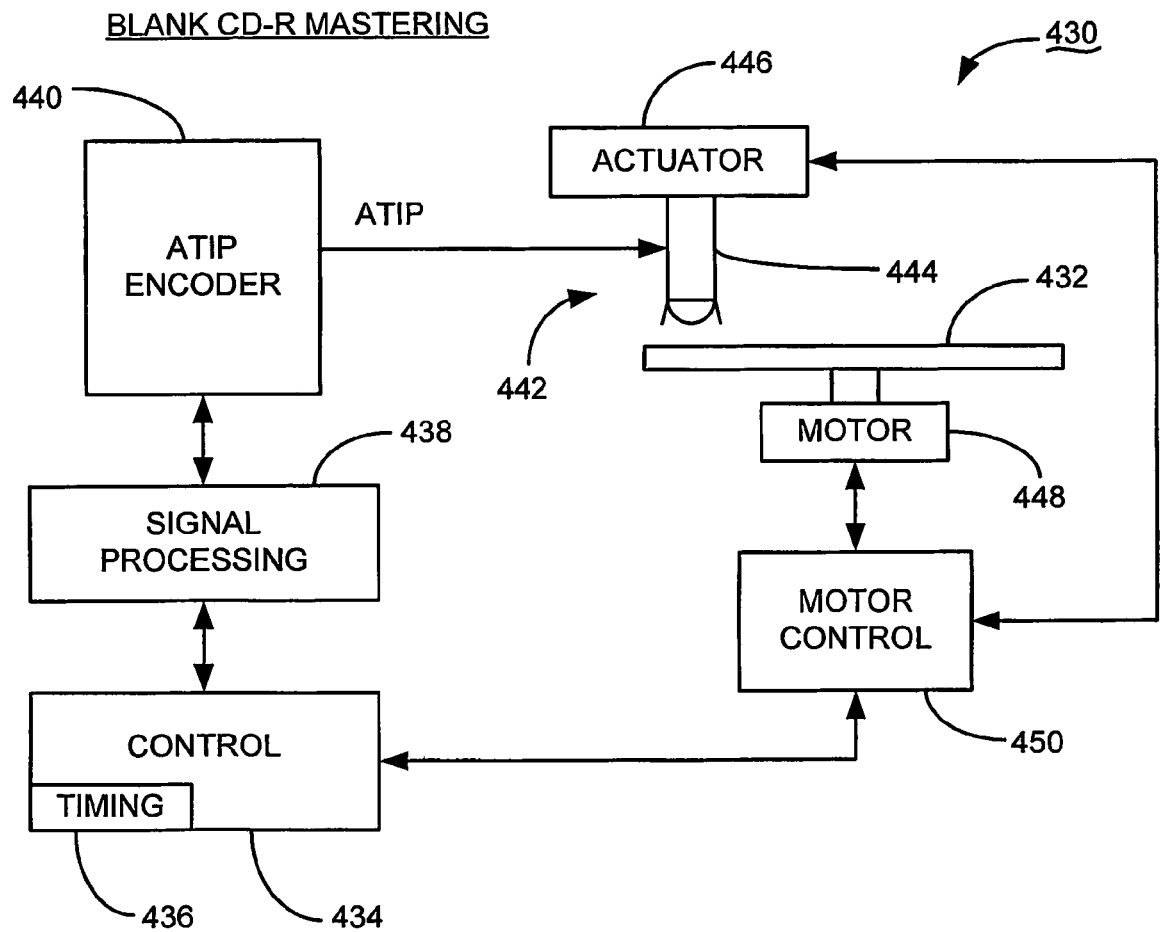
FIG. 15 is a functional block diagram of a mastering system used to write the pre-groove of FIG. 14 to a master disc.

Accordingly, FIG. 15 shows a blank CD-R mastering system 430 configured in accordance with preferred embodiments of the present invention to provide replicated blank CD-R discs with self authentication features. The system 430 is generally similar to the CD mastering system 250 of FIG. 6. The system 430 allows the characteristics of the wobble pre-groove 420 to be selectively altered to predetermine the resulting two-dimensional relationships of the data subsequently written to the disc.

The system 430 is contemplated as being representative of equipment used by a CD-R fabrication facility to master a population of blank CD-R discs. The system 430 is preferably embodied in a CD-R laser beam recorder (LBR) with a PC or workstation front end and generates a CD-R master disc 432.

A control block 434 provides overall control for the system 430, and includes timing circuitry 436 similar to that discussed above in FIGS. 7 and 7A. A signal processing block 438 arranges the ATIP information for modulation by an ATIP encoder block 440. The ATIP encoder block 440 provides an ATIP signal to a write assembly 442 comprising a write laser 444 with associated optics and an actuator 446 configured to advance the write laser across the radius of the disc 432.

A motor 448 rotates the disc 432 at a desired rotational velocity. The motor 448 and write assembly 442 receive control inputs from a motor block 450, which communicates with the top level control block 434.

It will be noted that the mastering of the pre-groove by the system 430 is not generally carried out by modulating (turning off and on) the write laser 444 as is the case during the writing of data to a blank CD-R or as during the mastering of a glass master during a conventional CD mastering process. Instead, the laser 444 is maintained in a continuously on, low power state and the location of the light beam is precisely oscillated as the disc 432 is rotated.

This results in the selective exposure of a thin coat of photoresist on the disc 432 corresponding to the desired location and shape of the pre-groove 420. Once the photoresist has been exposed, conventional processing steps are carried out (i.e., washing, electroplating, stamper formation, injection molding, etc.) to provide a population of replicated blank CD-R discs as shown in FIGS. 12-14.

Figure 16:
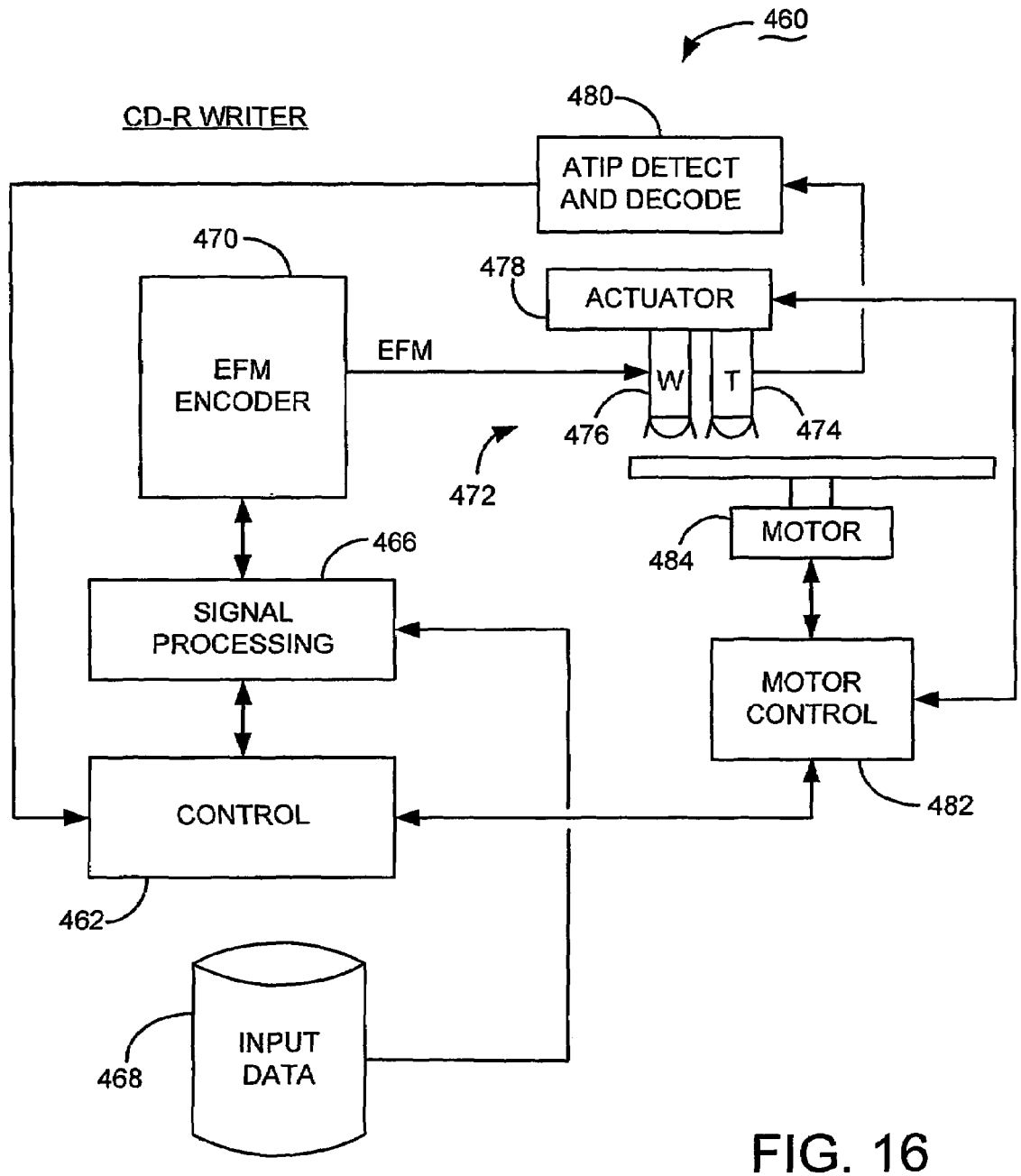
FIG. 16 provides a functional block diagram of a recording system used to detect and decode the information from the wiggle pre-groove and write data to the recordable medium of FIGS. 12 and 13.

The replicated blank CD-R discs are thereafter recorded using a CD-R writer system 460, as shown in FIG. 16. The CD-R writer system 460 detects and decodes the ATIP information from the pre-groove 420 and use this information to control the writing of the application data to the recorded CD-R discs. Since the CD-R writer system 460 preferably takes a substantially conventional form, various details and subsystems have been omitted for ease of discussion. It will be noted that CD-R writer systems such as 460 are often standard components in present generation, commercially available personal computers (PCs).

The system 460 includes a control block 462 that provides top level control for the system. A signal processing block 466 receives input data from source 468, formats the input data into the desired form and generates the requisite subcode and error detection and correction (EDC) codes. The signal processing block 466 provides a bit stream to an EFM (extended frequency modulation) encoder 470 which generates an EFM signal representative of the desired pit and land sequence on the recorded CD-R 400.

The writer system 460 further includes a write assembly 472 comprising a tracking (T) laser assembly 474, a write (W) laser assembly 476 and an actuator 478. The tracking laser assembly 474 emits a light beam with selected focal depth and width to detect the pre-groove 420, while the write laser assembly 476 is modulated by the EFM signal from the encoder 470 to write the application data to the disc. A readback signal from the tracking laser assembly 474 is provided to an ATIP detect and decode block 480.

The block 480 decodes the timing information from the nominal frequency of the wobble to enable a motor control block 482 to provide the necessary control signals to a motor 484 to rotate the disc 400 at the appropriate velocity, and to enable the control block 482 to correctly position the write laser assembly 476 to nominally follow the pre-groove 136.

The block 430 further decodes the control information frequency modulated within the pre-groove 420 to provide address and header information. This allows the Nth sector of application data to be overlayed upon the Nth ATIP sector (or some selected offset therebetween), the N+1 sector of application data to be overlayed upon the N+1 ATIP sector, and so on.

As mentioned above, all of the CD-Rs provided by the application provider from the similarly configured blank CD-Rs will have the same two-dimensional relationships between various sectors (such as shown in FIG. 4). An unauthorized bit-for-bit exact duplicate copy of the CD-R, written to a standard CD-R not having the specially encoded ATIP information, will have different relationships between the sectors. The duplicate disc will therefore fail the authentication process and will not operate correctly by the application system.

Even if efforts are taken to try to determine the actual relationships between the various authentication sectors, such relationships cannot be incorporated using blank CD-R media with different ATIP information. Thus, the CD-R media is self authenticating and effective copy protection is effected.

Other types of disc authentication steps during disc initialization are readily envisioned. For example, the disc authentication steps can include a sequence whereby the elapsed time (or motor speed) is detected while a number of different data sectors from different regions of the disc are accessed. Only discs having the specially configured ATIP information will exhibit such profiles, and unauthorized duplicate CD-Rs will be rejected.

In some embodiments, the various modifications to the ATIP information can be used to provide forensic tracking information to the disc. This is useful for a variety of applications including audio CDs. Audio CD players do not typically utilize an application that is launched to verify the authenticity of the disc prior to granting access. Rather, CD players simply start playing the disc from lead-in to lead-out. Nevertheless, the placement of hidden codes relating to the authenticity of the disc can be effected using specially configured ATIP information, and such codes will not appear on unauthorized duplicate discs.

It will be recalled that the changes in data rate are preferably selected (e.g., see disruption zones 310, 312 in FIG. 8) to not cause the readback capabilities of the CD-R writer system 460 to lose frequency lock. The reason for this is simple; in order to accurately write the application data to the CD-R 400, the system 460 should accurately follow the pre-groove 420 since it is this information that ensures the write laser assembly 476 is properly positioned.

However, it is contemplated that, as desired, the ATIP information in the pre-groove can be modified such that a highly accurate system can readily follow the ATIP information and accurately provide the data to the recorded CD-R, while the resulting data disruption zones 310, 312 cause a loss of frequency lock during subsequent playback of the recorded disc during continuous readback from lead-in to lead-out in a reader system. This will advantageously frustrate efforts to apply analog duplication techniques.

In practice, it is contemplated that the specially configured blank CD-Rs from the fabrication facility will have a confidential layout that is specified by the application provider, and the same specially configured blank CD-Rs will not be made commercially available to other parties. Alternatively, or additionally, the fabrication facility can make a large number of different types of CD-Rs available to anyone, with the different types of CD-Rs each having a unique ATIP modification scheme.

In this way, a given computer ROM or game application CD-R (which uses an authentication sequence as discussed above) would generally only be successfully copied using the same type of CD-R. While not wholly preventing the unauthorized copying of discs, such would at least frustrate the efforts of casual copyists, since additional effort would be required to first identify the particular "model" of CD-R utilized, and then procure the same model type in order to create a copy of the original.

Having concluded a discussion of various preferred embodiments relating to CD-R discs, DVD-R discs will now be briefly discussed. As those skilled in the art will appreciate, DVD-R discs are similarly provided with pre-groove information, but utilize two separate signals. A first, continuous sine wave wobble signal is used to emboss a sine waveform that can be used for timing control. A second, concurrently applied modulated write signal provides header and other control information.

To provide a DVD-R with specially configured pre-groove information, both signals could be readily modified during mastering as discussed above. As previously mentioned, similar steps can readily be taken for various other types of recordable media, including CD-WO, CD-R/W, DVD-R/W, etc.

Figure 17:
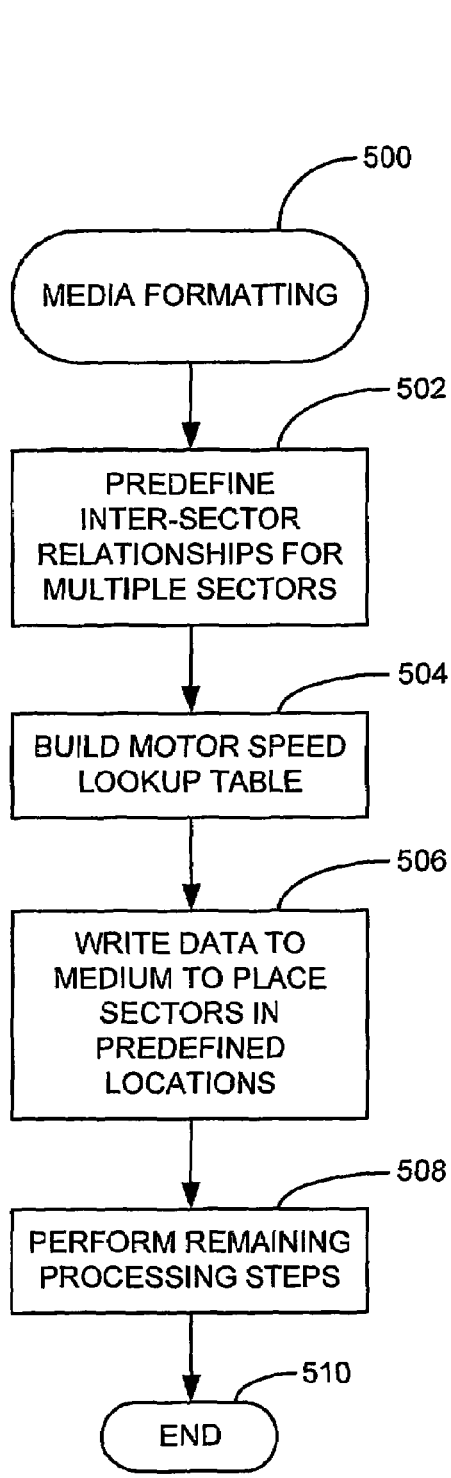
FIG. 17 is a flow chart for a MEDIA FORMATTING routine generally illustrative of steps carried out in accordance with preferred embodiments of the present invention to predetermine the physical locations of selected sectors on a prerecorded or recordable medium such as discussed above for authentication purposes.
Figure 18:
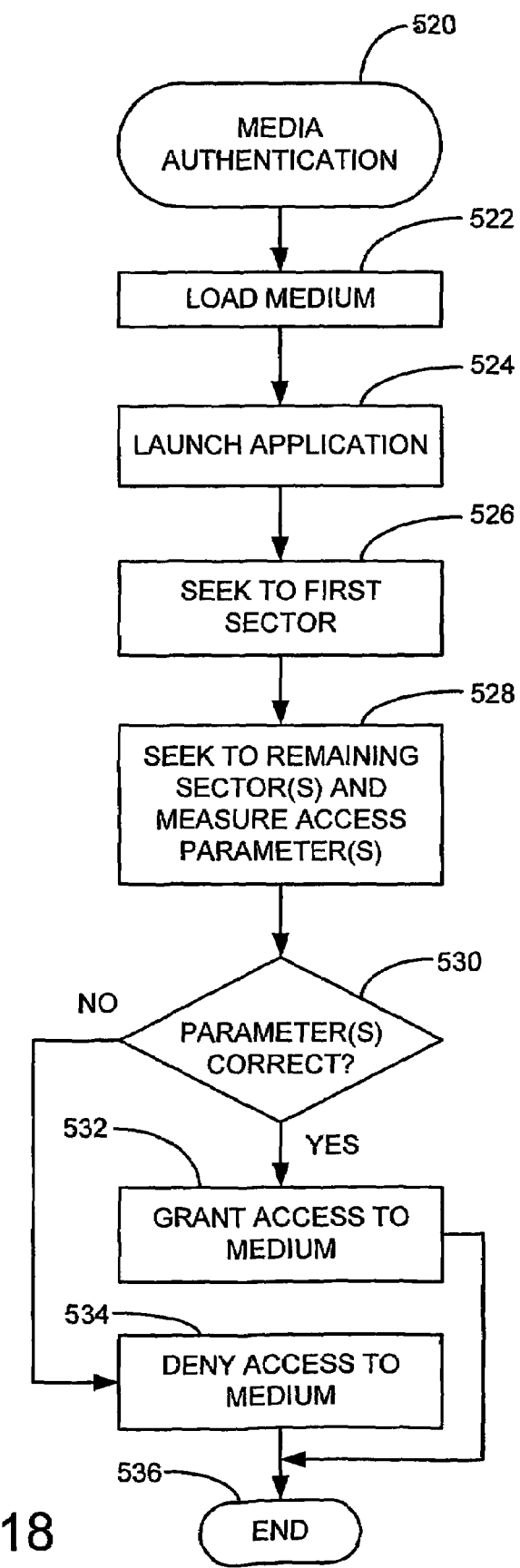
FIG. 18 is a flow chart for a MEDIA AUTHENTICATION routine generally illustrative of steps carried out in accordance with preferred embodiments of the present invention by an application routine executed by the system of FIG. 1 to determine whether a particular medium copy is an authentic copy.

FIGS. 17 and 18 have been provided to summarize the foregoing discussion of pre-recorded and recordable media. FIG. 17 provides a flow chart for a MEDIA FORMATTING routine 500.

At step 502, inter-sector relationships are predetermined for various sectors on the medium. This is preferably carried out as discussed above by establishing the number of bits that will appear on each track, resulting in a predetermined relationship between the resulting physical locations of at least a first sector and a second sector. As desired, the predetermined relationship can additionally encode a forensic data payload as discussed above as a second set of data written to the medium.

By way of example, for a preselected sequence of a subset of the sectors written to the medium, a "short" access time between sectors can be taken as a logical one and a "longer" access time between sectors can be taken as a logical zero. Alternatively, with reference again to FIG. 9, "lower" than standard motor speeds for selected sectors can be assigned a logical zero and "higher" than standard motor speeds for selected sectors can be assigned a logical one. In this way, a digital sequence relating to any number of forensic parameters such as mastering source, date, location, equipment, etc. can be embedded as a digital fingerprint. The forensic information can be used when a particular lot of media is examined, since absence of valid forensic information will be conclusive proof that the media were generated using an unauthorized process.

Continuing with the flow of FIG. 17, at step 504 suitable lookup table values are established for the lookup table 292 (FIGS. 7 AND 7A) to write the predetermined number of channel bits to each track, and data are recorded to the medium using the lookup table values at step 506. It will be noted that step 506 preferably involves writing encoded data via an EFM signal to a glass master for prerecorded discs (FIG. 6), and writing selectively altered ATIP data to a glass master for recordable discs (FIG. 15).

Remaining process steps are carried out at step 508 (stamper generation, replica formation, etc.) to produce at least one prerecorded or recordable medium with the desired format. When the medium is recordable, step 508 is contemplated as further including an additional write operation to write data to the locations specified by the ATIP information (FIG. 16). The routine then ends at step 510.

FIG. 18 provides a flow chart for a MEDIA AUTHENTICATION routine 520 that provides copy protection verification for a medium produced in accordance with FIG. 17. It is contemplated that the routine 520 is representative of programming stored and executed by the readback processor 110 of FIG. 1.

At step 522, the formatted medium is loaded into a reader bay (FIG. 1) and an application routine is launched at step 524. The application routine causes a seek to a first selected sector on the medium, step 526, and then preferably carries out seeks to a number of remaining sector(s) on the medium while measuring parameters associated with the sectors, step 528. Such parameters indicate the various sectors are located at the correct inter-sector dimensional relationships and can include the elapsed access time required to reach the various sectors, the measured motor speed while various sectors are read, etc.

As shown by decision step 530, when the measured access times fall within predefined windows indicating that the medium is an authorized copy, the routine continues to step 532 wherein the application routine grants further access to the medium. Contrawise, when the access times are incorrect, the medium is determined to be an unauthorized duplicate and access is denied, step 534. The routine then ends at step 536.

It will now be apparent that the present invention (as embodied herein and as claimed below) provides several important advantages over the prior art. The ability to predetermine the resulting locations of sectors on a pre-recorded disc eliminates any need to write the data and then examine the resulting disc to determine what inter-sector relationships have been created during normal processing. While this latter approach can be used for disc authentication purposes, it will be noted that a separate set of data (snapshot of the disc) needs to be maintained and ported with the disc; predetermining the relationships eliminates this requirement.

Also, since glass master generation processes tend to have a generational limit on the number of stampers that can be formed from a single master, the above process therefore limits the authentication capabilities to replicated discs made with the same master. By contrast, predetermining the exact locations and relationships of the sectors in accordance with the present disclosure enables the generation of any number of different master discs, all of which produce replicated discs with the same predetermined relationships.

Another advantage relating to the embodiments associated with pre-recorded media is that the preselection of the inter-sector relationships can be provided so as to ensure that the various sectors will have significantly different locations when the contents of the media are pirated onto any number of different types/sources of recordable media (CD-R, DVD-R, etc.).

Yet another advantage is the ability to generate self-authenticating recordable media (such as CD-R and DVD-R, etc.). The formation of "specially configured" recordable media that produce inter-sector relationships that are different from those obtained using conventional recordable media provide a significant improvement in the ability for commercial application providers to provide copy protected media. Commercial providers of applications on optical discs, for example, can include extra "blank" recordable discs that are specially configured to provide the sectors in the correct locations for user backup purposes, along with a statement that copying the contents to other conventional discs will result in nonfunctional backup discs.

For purposes of the appended claims, the term pre-recorded will be understood to describe a type of medium (such as a CD, DVD, etc.) having an architecture whereby the recorded contents are permanently established within the medium prior to provision to the end user/application provider, such as by the internal recording layer 234 of FIG. 5. The term recordable will be understood a type of medium (such as a CD-R, CD-R/W, DVD-R, DVD-R/W, hybrid discs, floppy diskettes, etc.) to which data can be subsequently written by the end user/application provider. The latter includes a pre-groove or similar pre-formatting information that specifies where selected sectors are to appear in the resulting media, with the locations selected to identify such copies as authentic copies.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although embodiments described herein are generally directed to authentication of optical discs, it will be appreciated that any number of different formats and types of optical discs, as well as any number of other formats and types of data storage media can be readily utilized without departing from the spirit and scope of the claimed invention.

The invention claimed is:

1. A method comprising a step of formatting a data storage medium of the type in which data are stored in addressable sectors on a plurality of tracks using a predetermined profile that identifies a total number of channel bits to be recorded to the medium over each revolution of a plurality of revolutions of said medium so as to affirmatively establish a predefined relationship between physical locations of at least a first sector and a second sector prior to an initial recording of data to said at least first and second sectors, the presence of said predefined relationship between the resulting physical locations of the at least first and second sectors serving to identify the medium as an authorized copy.

2. The method of claim 1, wherein the predetermined relationship of the formatting step is further selected to encode a forensic information payload on the medium.

3. The method of claim 1, wherein the data storage medium is characterized as a master copy, and wherein the method further comprises generating a population of replicated copies from the master copy, each replicated copy exhibiting the predefined relationship.

4. The method of claim 1, further comprising a step of subsequently recording data to the at least first and second sectors.

5. The method of claim 4, further comprising a step of subsequently reading back the data recorded to the first and second sectors to identify the presence of the predefined relationship.

6. The method of claim 5, wherein the presence of the predefined relationship is determined during the reading back the data step by measuring a rotational speed of the medium while the first and second sectors are read.

7. The method of claim 5, wherein the presence of the predefined relationship is determined during the reading back the data step by measuring a required access time to move a transducing head from the first sector to the second sector.

8. The method of claim 5, further comprising a step of granting access to remaining sectors on the medium in response to the identification of the presence of the predefined relationship during the subsequently reading back the data step.

9. The method of claim 1, wherein the data storage medium of the formatting step is characterized as a prerecorded medium.

10. The method of claim 1, wherein the data storage medium is characterized as a recordable medium so that the formatting step comprises generating a frequency modulated pre-groove on the medium which predetermines the locations of the sectors to be written to replicated copies of the medium.

11. The method of claim 1, wherein the data storage medium of the formatting step is characterized as an optical disc.

12. A data storage medium formatted in accordance with the method of claim 1.

13. The method of claim 1, wherein the first and second sectors are each respectively characterized as non-defective sectors to which user data are stored and subsequently retrieved.

14. A method comprising steps of:
providing a profile that identifies a total number of channel bits to be recorded to a storage medium over each revolution of a plurality of revolutions of said medium during a write operation to affirmatively establish a predetermined relationship between a first physical location of a first data sector and a second physical location of a second data sector; and
subsequently modulating a write signal in relation to said profile to write the respective first and second data sectors at the respective first and second physical locations thereby establishing said predetermined relationship on the medium;
wherein the providing step comprises constructing a lookup table which specifies a rotational speed of the data storage medium for each revolution of the data storage medium during the subsequently modulating step, said lookup table selected so that a predetermined number of channel bits are recorded to the data storage medium over each said revolution.

15. The method of claim 14, further comprising reading the medium, and granting access to remaining data sectors on the medium in response to a detection of a presence of said predetermined relationship during the reading step.

16. The method of claim 14, wherein the data storage medium is characterized as a recordable master so that the subsequently modulating step comprises generating a frequency modulated pre-groove on the medium to establish the locations of the first and second data sectors on a replicated recordable medium formed from the recordable master.

17. The method of claim 14, further comprising a step of forming a population of replicated copies from the data storage medium.

18. The method of claim 16, further comprising a step of copying the sectors from a selected one of the replicated copies to another medium to form a duplicate copy, wherein the duplicate copy has a relationship between the resulting physical locations of the first and second sectors that is different from the predetermined relationship on the selected one of the replicated copies.

19. The method of claim 14, wherein the data storage medium is characterized as an optical disc.

20. The method of claim 14, wherein the predetermined relationship of the providing step is further selected to encode a forensic information payload on the medium.

21. The method of claim 14, further comprising reading back data recorded to the first and second sectors to identify the presence of the predefined relationship.

22. The method of claim 21, wherein the presence of the predefined relationship is determined during the reading step by measuring a rotational speed of the medium while the first and second sectors are read.

23. The method of claim 21, wherein the presence of the predefined relationship is determined during the reading step by measuring a required access time to move a transducing head from the first sector to the second sector.

24. The method of claim 21, further comprising a step of granting access to remaining sectors on the medium in response to the identification of the presence of the predefined relationship during the reading step.

25. A data storage medium comprising a plurality of addressable data sectors formed on a plurality of tracks, the sectors located in preselected physical locations in accordance with a profile generated prior to recording of the sectors which identifies a total number of channel bits to be recorded to the medium over each revolution of a plurality of revolutions of the medium, the profile establishing a predetermined relationship between the physical locations of at least selected sectors to identify the data storage medium as an authorized copy.

26. The data storage medium of claim 25, further characterized as a prerecorded medium formed as a replicated copy from a mastering process.

27. The data storage medium of claim 25, further characterized as a recordable medium having pre-groove information recorded to the medium in relation to the profile so that, when data are subsequently written to the medium, the sectors are located in relation to the pre-groove information.

28. The data storage medium of claim 25, wherein the data storage medium is characterized as an optical disc.

29. The data storage medium of claim 28, wherein the optical disc further stores an application program which is configured to, when executed, direct an access operation upon the at least selected sectors, grant access to remaining portions of the optical disc when a presence of the predetermined relationship is determined from said access operation, and deny access to remaining portions of the optical disc when an absence of the predetermined relationship is determined from said access operation.

30. The data storage medium of claim 28, wherein the optical disc is characterized as a digital versatile disc (DVD).

31. The data storage medium of claim 28, wherein the optical disc is characterized as a pre-recorded optical disc.

32. The data storage medium of claim 28, wherein the optical disc is characterized as a recordable optical disc to which data can be subsequently recorded.

33. The data storage medium of claim 25, wherein said selected sectors are each respectively characterized as non-defective sectors to which user data are stored and subsequently retrieved.

34. An application routine executed in a processor environment to read data from a data storage medium, the medium formatted by predetermining desired physical locations of a plurality of sectors the medium using a profile which identifies a total number of channel bits to be recorded to the medium over each revolution of a plurality of revolutions of the medium to establish a predetermined relationship between at least a first selected sector and a second selected sector prior to recording of data to the medium to locate said sectors, and by subsequently modulating a writing signal to locate said sectors on the data storage medium in the predetermined desired physical locations, wherein the application routine is configured to measure an access parameter relating to a sequential access of the at least first and second sectors, grant access to remaining sectors on the medium when the measured access parameter indicates the predetermined relationship is present on the medium, the presence of the predetermined relationship indicating that the medium is an authorized copy, and to deny access to remaining sectors on the medium when the measured access parameter indicates the predetermined relationship is not present on the medium, the absence of the predetermined relationship indicating that the medium is an unauthorized duplicate.

35. The application routine of claim 34, wherein the access parameter measured by the application routine comprises a speed of a motor used to rotate the medium, said speed measured as each of the at least first and second sectors are accessed.

36. The application routine of claim 34, wherein the access parameter measured by the application routine comprises an elapsed access time required to move a data transducing head from the at least first sector to the at least second sector.

37. The application routine of claim 34, wherein the application routine further decodes a forensic data payload from the predetermined relationship.

38. An apparatus comprising:
a predetermined profile stored in a memory space which specifies a total number of channel bits to be written to a data storage medium over each revolution of a plurality of revolutions of the medium; and
a mechanism which applies a write signal to the medium in relation to said profile to sequentially form a first data sector and a second data sector at respective first and second physical locations on the medium, wherein the mechanism comprises:
a motor configured to rotate the medium in response to a motor speed rotation signal;
a write assembly which writes data to the medium during rotation of said medium in response to a write signal, wherein at least a selected one of the motor speed rotational signal or the write signal are modulated in relation to said profile;
a master clock which generates a master clock signal at a first frequency;
a clock divider circuit which outputs a write clock signal in response to the master clock signal, the write clock signal establishing timing of transitions in the write signal; and
a programmable generator circuit which outputs the motor speed rotation signal in response to the master clock signal and the pre-generated profile.

39. An apparatus comprising:
a predetermined profile stored in a memory space which specifies a total number of channel bits to be written to a data storage medium over each revolution of a plurality of revolutions of the medium; and a mechanism which applies a write signal to the medium in relation to said profile to sequentially form a first data sector and a second data sector at respective first and second physical locations on the medium, wherein the mechanism comprises:

a motor configured to rotate the medium in response to a motor speed rotation signal;

a write assembly which writes data to the medium during rotation of said medium in response to a write signal, wherein at least a selected one of the motor speed rotational signal or the write signal are modulated in relation to said profile;

a master clock which generates a master clock signal at a first frequency;

a programmable generator circuit responsive to the master clock signal which outputs a write clock signal to establish timing of transitions in the write signal; and a lookup table responsive to a once-per-revolution signal from the motor which outputs values to the programmable generator circuit in relation to the pre-generated profile to adjust frequency of the write clock signal so that an exact, predetermined number of channel bits are written to the medium over each revolution of the medium.

* * * * *